United States Patent [19]
Victory

[11] 3,926,359
[45] Dec. 16, 1975

[54] METHOD OF CONVERTING BRAKE BAND END CONNECTION

[76] Inventor: Thomas J. Victory, 25167 Harcourt, Farmington, Mich. 48024

[22] Filed: Oct. 29, 1973

[21] Appl. No.: 410,708

Related U.S. Application Data

[63] Continuation of Ser. No. 256,447, May 24, 1972, Pat. No. 3,785,042.

[52] U.S. Cl. ............ 228/170; 188/250 H; 188/259; 192/107 T
[51] Int. Cl.² .......................................... B23K 1/20
[58] Field of Search ........ 188/77 R, 77 N, 249, 259, 188/250 H; 192/80, 81 R, 107 T; 29/475, 482; 228/170

[56] References Cited
UNITED STATES PATENTS

| | | | |
|---|---|---|---|
| 2,741,339 | 4/1956 | Barton | 188/249 |
| 3,399,749 | 9/1968 | Baule | 188/259 |
| 3,483,955 | 12/1969 | Schell et al. | 192/81 R X |
| 3,785,042 | 1/1974 | Victory | 188/259 |

Primary Examiner—Trygve M. Blix
Attorney, Agent, or Firm—Harness, Dickey & Pierce

[57] ABSTRACT

An end connection for a brake band used in automatic transmission housings which permits installation of a replacement band without the necessity of removing and dismantling the transmission. The end connection comprises a curved end plate welded to the strap and a low profile strut seat welded to the end plate. A bent back extension on the strap reinforces the strut seat. One corner of the end connection is relieved to facilitate entry into the housing. The construction is such that a popular conventional end connection may be converted to the connection of this invention without new parts being required.

2 Claims, 2 Drawing Figures

METHOD OF CONVERTING BRAKE BAND END CONNECTION

This is a continuation, of application Ser. No. 256,447, filed May 24, 1972 now U.S. Pat. No. 3,785,042 issued Jan. 15, 1974.

BACKGROUND OF THE INVENTION

1. Field of the Invention

The invention relates to brake bands used in planetary type automatic transmission housings to selectively lock a ring gear drum against rotation with respect to the transmission housing. The invention is particularly concerned with the replacement of brake bands which are broken or slipping. Because of the small clearance between the drum and transmission housings, it is presently necessary to remove the transmission from the vehicle and disassemble it in order to install the band in an axial direction. The transmission must then be reassembled and installed in the car, resulting in very high labor costs for brake band replacement.

The invention has particular application to a flexible resilient brake band and its double folded end connections shown in Baule U.S. Pat. No. 3,399,749 which is a widely used construction. The method of this invention enables such end connections to be easily converted to a construction according to the invention without the necessity of additional parts.

2. Description of the Prior Art

Patents showing brake band end connections for the same general purpose include Somerville No. 1,528,957 dated Mar. 10, 1925, Hoffman No. Re. 16,028 dated Mar. 24, 1925 and Cole No. 1,562,687 dated Nov. 24, 1925. These prior constructions, however, have various drawbacks in terms of cost of manufacture and operability, which it is an object of the present invention to overcome.

Other prior patents discovered in a search which are generally pertinent but do not teach the present invention are the following:

Edel, U.S. Pat. No. 1,395,670, Nov. 1, 1921; Smith, U.S. Pat. No. 1,500,341, July 8, 1924; Smith, U.S. Pat. No. 1,520,154, Dec. 23, 1924; Hoffman, U.S. Pat. No. 1,787,376, Dec. 30, 1930; Reed et al., U.S. Pat. No. 2,692,663, Oct. 26, 1954; Lang, U.S. Pat. No. 3,367,466, Feb. 6, 1968; Schell, U.S. Pat. No. 3,542,181, Nov. 24, 1970.

BRIEF SUMMARY OF THE INVENTION

It is an object of the present invention to provide a novel and improved end connection for a transmission brake band which is extremely inexpensive to manufacture, is sturdy and reliable in use, and permits easy installation of the brake band without the necessity of dismantling the transmission.

It is a further object to provide an improved brake band end connection of this nature which may be fabricated from an existing popular type of end connection without further parts being needed.

It is another object to provide a method of manufacturing an end connection for a brake band which results in an inexpensive brake band capable of being installed in an automatic transmission housing without disassembling the transmission.

The method of manufacturing a brake band end connection contemplated by this invention is especially intended for use with a brake band end connection of the type shown in the aforementioned Baule U.S. Pat. No. 3,399,749. This connection is formed by a backing strip secured to the strap and double-folded upon itself to form a strut pocket and a reinforcement for the pocket. According to the method of this invention, the connecting portion between the two folds is cut away, the inner fold partially flattened, and the outer fold welded to the back of the inner fold. This greatly reduces the radial dimension of the end connection, permitting it to be inserted endwise into the transmission housing. One corner of the end connection is relieved to facilitate entry into the housing, the band being installed by positioning it diagonally across the pan opening with the end having the relieved corner entering under the servo body.

DESCRIPTION OF THE PREFERRED EMBODIMENT

Figure 1:
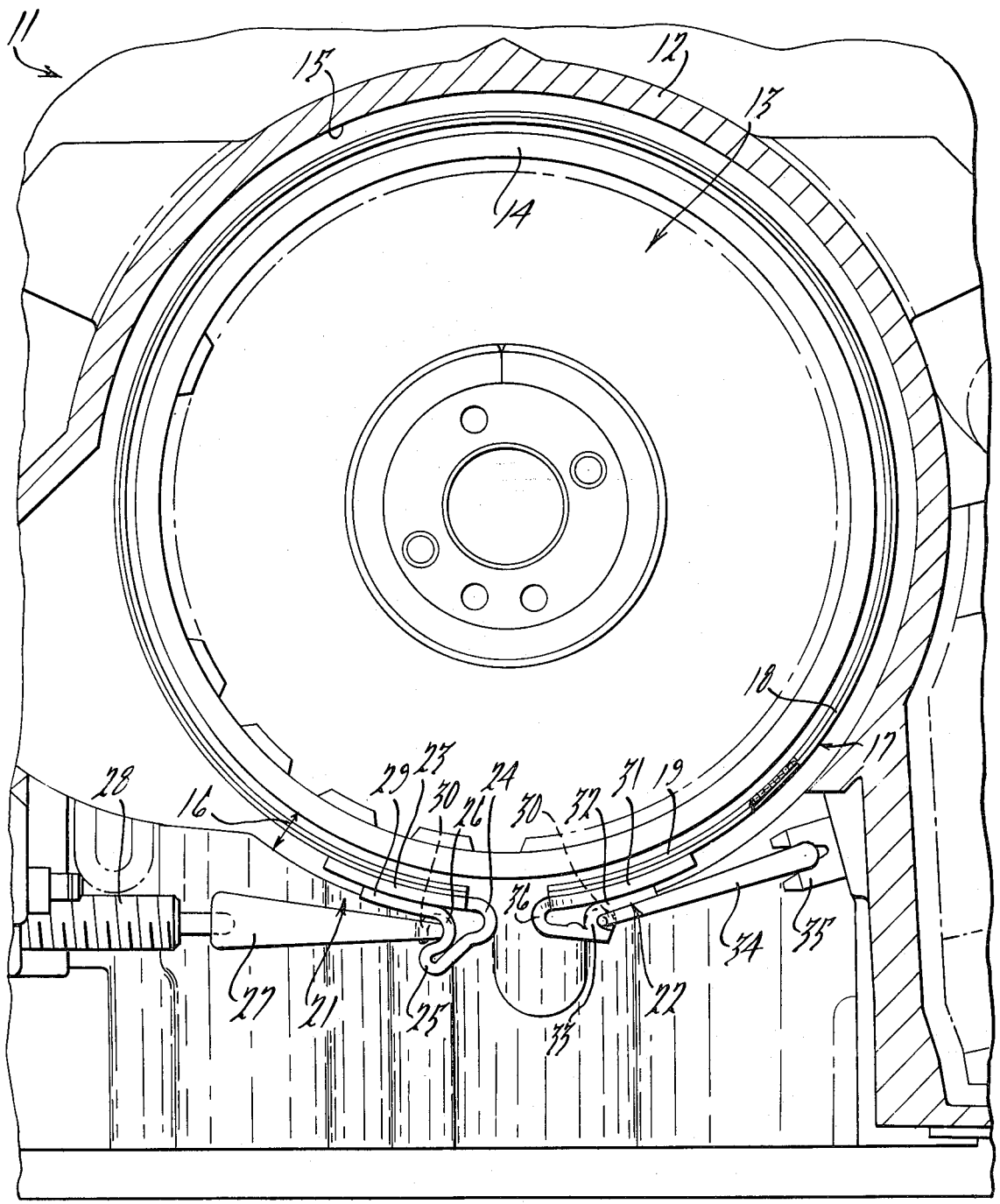
FIG. 1 is a cross-sectional view in elevation of a portion of a transmission housing showing the planetary gear ring drum and the brake band of this invention in installed position.

The transmission is generally indicated at 11 and comprises a housing 12 for the planetary gear system generally indicated at 13. Portions of this system are omitted for purposes of clarity, but the brake drum is indicated at 14, this drum being connected to the ring gear (not shown). The clearance between the outer surface of drum 14 and the internal surface 15 of housing 12 is indicated by the double ended arrow 16 in FIG. 1.

The brake band is generally indicated at 17 and comprises a strap 18 of flexible resilient metal and a friction material layer 19 bonded thereto and engageable with drum 14.

The end connections of the brake band are indicated at 21 and 22 respectively. End connection 21 is constructed similarly to the connections shown in the Baule patent, with a curved end plate 23 welded to strap 18. This end plate has a first fold 24 from which the plate angles outwardly and rearwardly, a sharp bend 25 and a second fold 26 which forms a pocket for strut 27 mounted on adjustable backup screw 28. A terminating portion 29 on fold 26 overlaps the inner portion of plate 23 and is welded thereto. A locating tab 30 is struck upwardly from end plate 23 and is received by a notch on strut 27 to prevent lateral displacement thereof.

A popular brake band now in use comprises two end connections constructed like end connection 21. Such a band can only be installed as a replacement band by removing the transmission from the car and disassembling it, since the radial dimension of the end connection is too great to permit it to be fed endwise through space 16 between drum 14 and housing surface 15. According to the method of the present invention, one of these end connections is converted to that indicated at 22. This end connection comprises a curved end plate 31 welded to strap 18 and a strut seat 32 overlapping and welded to the end plate. Strut seat 32 has a reversely curved pocket 33 for strut 34 which is connected to piston rod 35. End plate 31 has a reversely bent reinforcement portion 36 which abuts the outside of pocket 33. Together, the two members afford sufficient strength to transmit the forces imparted through strut 34 by piston 35 to the brake band. However, the overall radial dimension of members 31 and 32 is less than the radial distance 16.

The method of converting an end connection such as that indicated at 21 to end connection 22 comprises the steps of cutting off the connecting portion 25 of an end connection 21 so that parts 31 and 32 are formed, partially flattening fold 26, and then bending fold 24 into position so that it backs up fold 26. The parts are then welded together. It should be observed that the lateral locating tab 30 for the strut is preserved during the conversion.

After or in conjunction with the welding operation, end connection 22 may be subjected to a heat and quench treatment to increase its strength. It may then be milled at a proper angle to blend in the edges and ground or otherwise finished. A relieved portion or radius 37 will be ground on one corner of end connection 22 for purposes described below.

Figure 2:
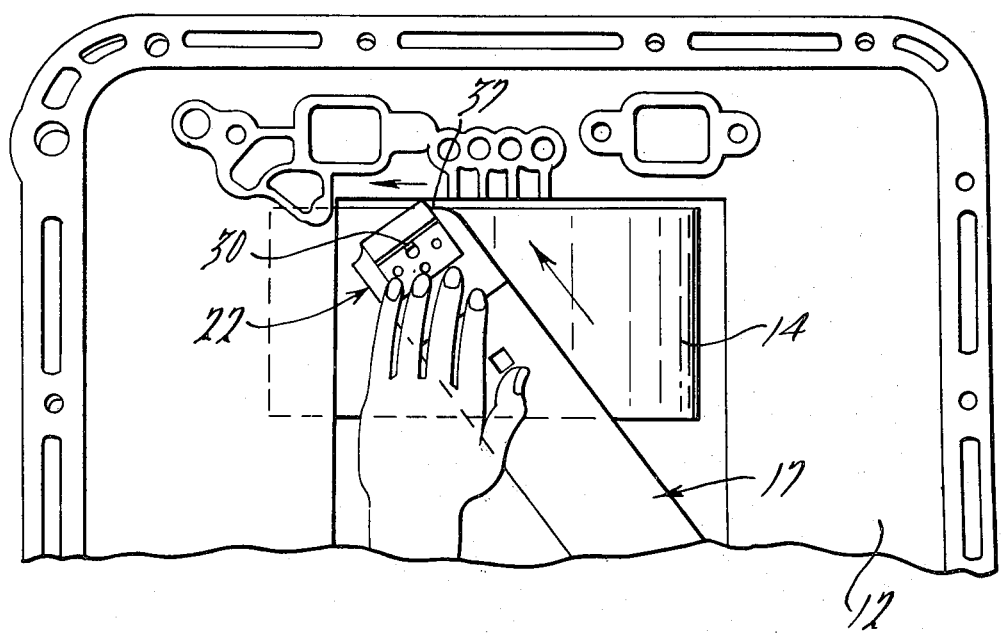
FIG. 2 is a fragmentary plan view of the housing showing the method of installation of the band.

FIG. 2 illustrates the manner in which the band of this invention is installed. With the vehicle on a service rack, the first step is to drain the oil from the transmission housing and remove the pan and valve body. All broken pieces of the old band are removed. When replacing a slipping band that is not broken, one band end is pulled downward and cut off with tin snips. The band of this invention is then installed by positioning it diagonally across the pan opening with the leading end (the end carrying connection 22) entering under the servo body. The band tip is slid sideways until it passes obstructions of the servo housing, the relieved corner 37 of band end 22 facilitating this movement. The band is fed around the drum allowing the band tip to follow the adjacent wall, which is the rear of the pump housing. After the band has been fed around the drum, it is guided down into position with a screwdriver or similar hooking tool. The struts are then installed and adjusted with screw 28. The valve body and oil pan may then be replaced and the transmission housing filled with oil.

I claim:

1. A method of converting a brake band end connection of the type having a strut seat formed by a double-folded end plate, the juncture uniting said two folds being radially outermost, to an end connection of narrower radial dimensions for installation between a drum and housing, comprising the steps of cutting off said juncture to thereby reduce the radial dimension of said end connection, and relieving one corner of said end connection to facilitate entry into said housing.

2. A method of converting a brake band end connection of the type having a strut seat formed by a double-folded end plate, the juncture uniting said two folds being radially outermost, to an end connection of narrower radial dimensions for installation between a drum and housing, comprising the steps of cutting off said juncture to thereby reduce the radial dimension of said end connection, welding the edge of the outer fold to the inner fold whereby the inner fold acts as a strut seat pocket and the outer fold acts as a reinforcement and relieving one corner of the end connection to facilitate entry into the housing.

* * * * *